United States Patent [19]

Yoshida

[11] Patent Number: 4,860,319
[45] Date of Patent: Aug. 22, 1989

[54] APPARATUS FOR COMPENSATING FOR PHASE HITS

[75] Inventor: Atsushi Yoshida, Tokyo, Japan

[73] Assignee: NEC Corporation, Japan

[21] Appl. No.: 78,045

[22] Filed: Jul. 27, 1987

[30] Foreign Application Priority Data

Jul. 30, 1986 [JP] Japan .................................. 61-177738

[51] Int. Cl.4 ............................................. H03D 3/22
[52] U.S. Cl. ......................................... 375/83; 375/86; 375/118; 329/112; 329/124
[58] Field of Search ...................... 375/86, 83, 81, 118, 375/120, 119, 80, 94, 97; 329/122, 50, 124, 110, 112, 104

[56] References Cited

U.S. PATENT DOCUMENTS

| 3,984,777 | 10/1976 | Noguchi | 375/86 |
| 4,217,551 | 8/1980 | Entenman | 375/81 |
| 4,330,861 | 5/1982 | Impallomeni et al. | 375/86 |
| 4,387,342 | 6/1983 | Grosjean | 375/83 |

Primary Examiner—Benedict V. Safourek
Assistant Examiner—Marianne Huseman
Attorney, Agent, or Firm—Laff, Whitesel, Conte & Saret

[57] ABSTRACT

In a receiver for data transmission, an apparatus for compensating for phase hits and, thereby, reducing transmission errors ascribable thereto is operated to modulate the phase of a delayed signal by a phase component signal so as to reduce the phase change of an output signal of a phase modulator.

5 Claims, 4 Drawing Sheets

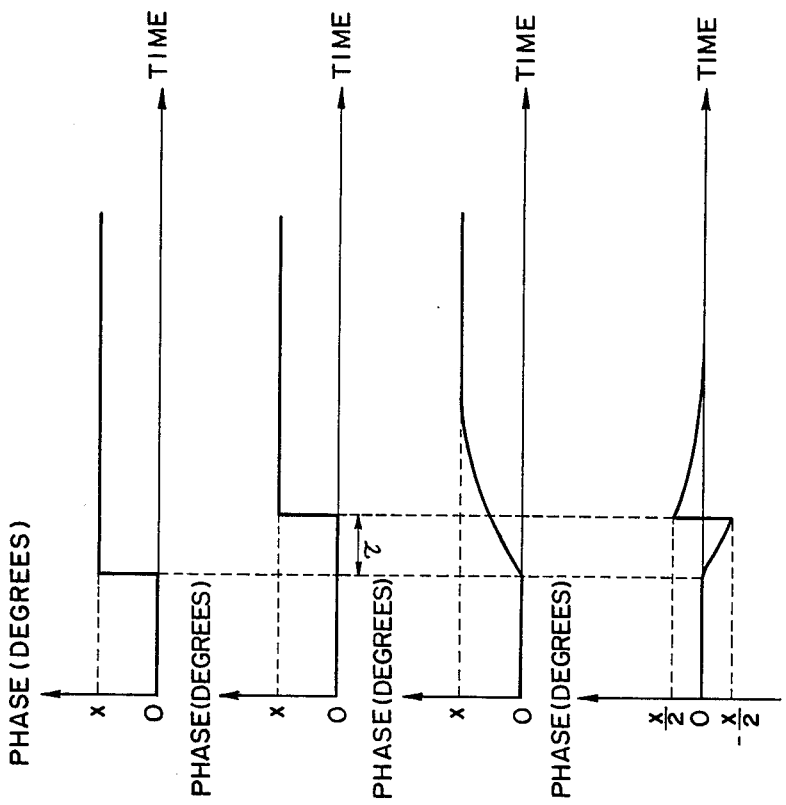

APPARATUS FOR COMPENSATING FOR PHASE HITS

BACKGROUND OF THE INVENTION

The present invention relates to an apparatus installed in a receiver for data transmission for compensating for phase hits which occur on a transmission channel to invite transmission errors.

In a phase hit compensating apparatus of the kind described, it has been customary to extract a carrier phase from a received signal and rotate the phase of the received signal so as to control the carrier phase to zero. A problem with this prior art control, generally referred to as a feedback control, is that upon occurrence of a phase hit of $\chi$ degrees the amount of phase rotation which should follow the phase hit cannot reach the $\chi$ degrees without a certain time constant, i.e., until a certain period of time expires. Hence, although the influence of such a phase hit may eventually be reduced to zero, it does affect the reception of data immediately after the occurrence of the phase hit. Especially, this problem is of cardinal importance when it comes to a phase modulation (PHM) type and a quadrature amplitude modulation (QAM) type receiver because, in these receivers, the increase of the phase hit angle over a certain limit causes transmission errors to occur all of a sudden.

SUMMARY OF THE INVENTION

It is, therefore, an object of the present invention to provide a phase hit compensating apparatus capable of reducing transmission errors due to phase hits.

It is another object of the present invention to provide a generally improved phase hit compensating apparatus.

An apparatus installed in a receiver for data transmission for compensating for a phase hit of the present invention comprises a carrier phase detecting means for detecting, out of phases of a carrier of a received signal, a component which is slower in phase change than phase jitter, a delaying means for delaying the received signal, and a phase modulating means for modulating an delayed signal output by the delaying means by a phase component signal which is produced by the carrier phase detecting means.

The above and other objects, features and advantages of the present invention will become more apparent from the following detailed description taken with the accompanying drawings.

BRIEF DESCRIPTION OF THE DRAWINGS

FIGS. 4A to 4D are diagrams showing waveforms which are representative of the operation of the apparatus as shown in FIG. 2.

DESCRIPTION OF THE PREFERRED EMBODIMENT

Figure 2:
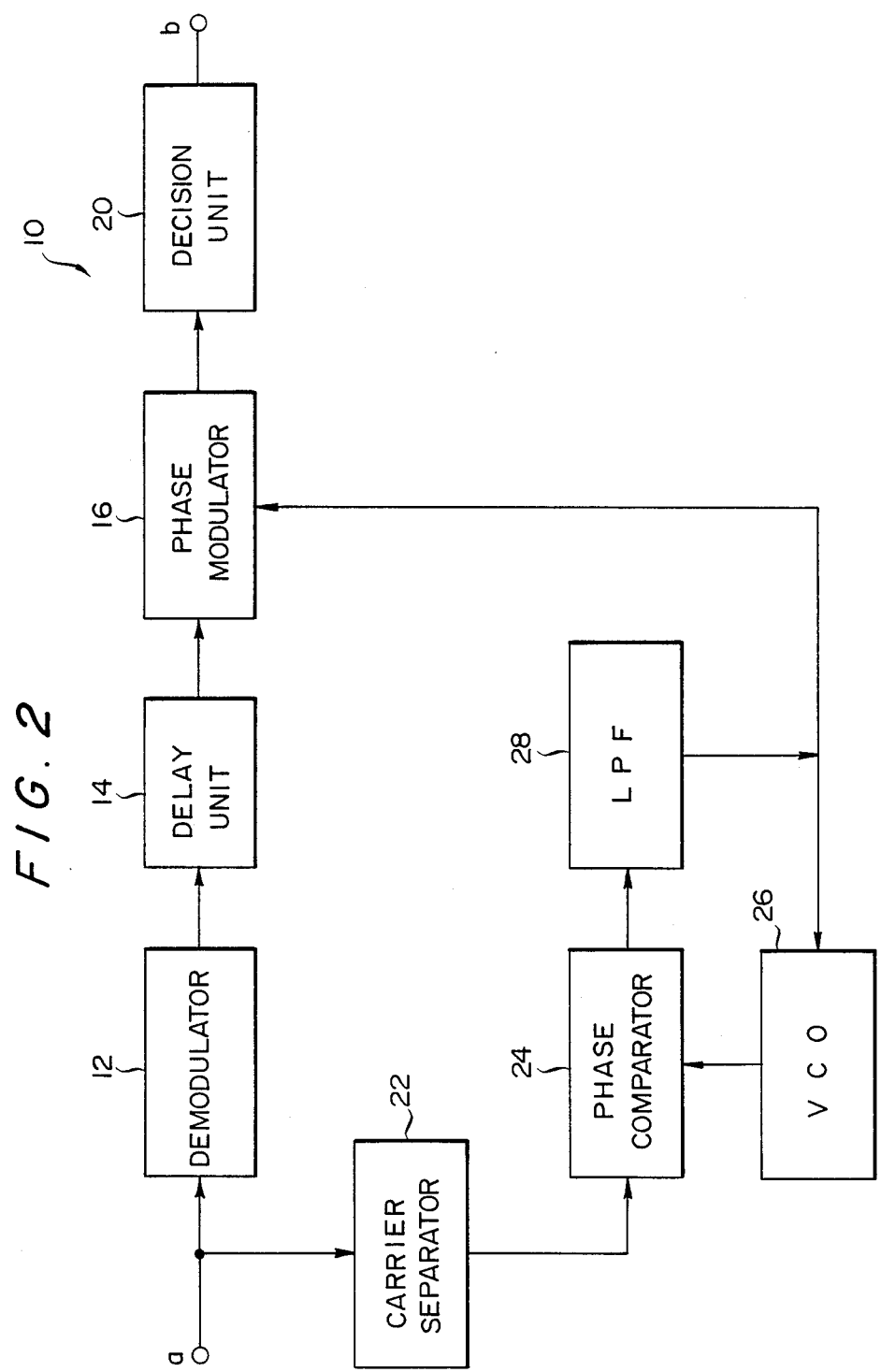
FIG. 2 is a block diagram showing a phase hit compensating apparatus embodying the present invention.

Referring to FIG. 2 of the drawings, a phase hit compensating apparatus in accordance with the present invention is shown and generally designated by the reference numeral 10. As shown, the apparatus 10 generally comprises a demodulator 12, a delay unit 14 which serves as a delaying means for producing a delayed signal, a phase modulator 16 which is implemented with a multiplier for serving as a phase modulating means, a decision unit 20, a carrier separator 22, a phase comparator 24, a voltage controlled oscillator (VCO) 26, and a low-pass filter (LPF) 28. The phase comparator 24, VCO 26 and LPF 28 cooperate to function as a carrier phase detecting means adapted to detect, out of the carrier phases of a received signal, a component which is slower in phase change than phase jitter.

In operation, a received signal which is an eight-phase modulation signal is applied to the demodulator 12 to be demodulated thereby. The demodulated signal is delayed by the delay unit 14 by a predetermined time $\tau$ (second) and, then, fed to the decision unit 20 via the phase modulator 16. In response, the decision unit 20 produces a signal b which is representative of a result of threshold decision, which will be described. The eight-phase modulation signal a is routed to the carrier separator 22 as well. The phase-locked network consisting of the phase comparator 24, VCO 26 and LPF 28 detects the phase of an output of the carrier separator 22, i.e., phase of the carrier. Using the phase component signal output by the phase-locked network, the phase modulator 16 modulates the phase of the output of the delay unit 14 to the opposite phase. The time constant of the phase-locked network is selected such that the period of time necessary for the step phase response to reach one half the final value is equal to the previously mentioned delay time $\tau$.

Figure 1:
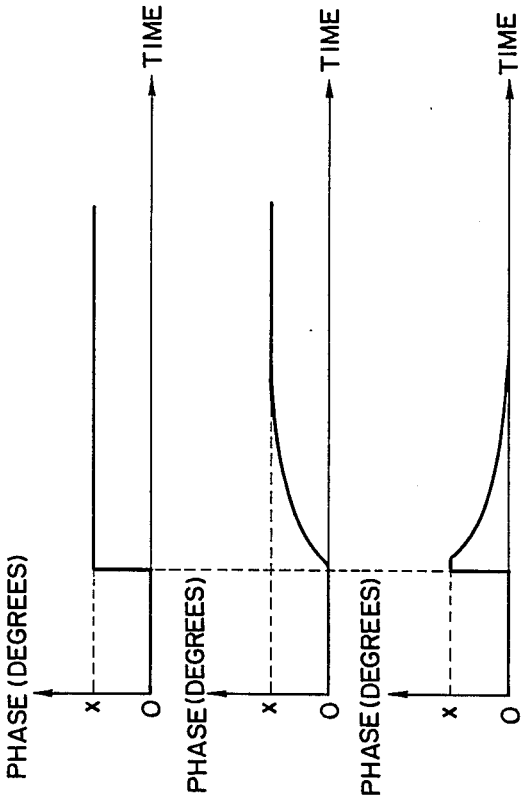
FIGS. 1A to 1C are diagrams showing waveforms for explaining the operation of a prior art phase hit compensating apparatus.
Figure 3:
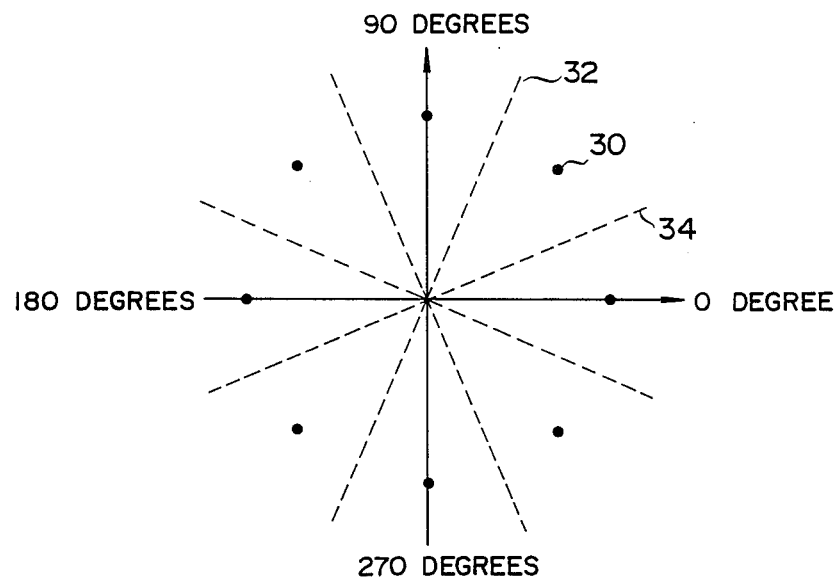
FIG. 3 is a signal diagram associated with the apparatus of FIG. 2.

FIG. 3 shows a signal diagram associated with this embodiment of the present invention. In the figure, a dot 30 is representative of a signal phase while broken lines 32 and 34 are representative of a decision threshold each. As shown, the signal phase 30 is spaced from the decision thresholds 32 and 34 by $\pm 22.5$ degrees. Specifically, if a phase change greater than $\pm 22.5$ degrees occur in the input to the decision unit 20, the decision will become erroneous. Assume that under such a condition a phase hit of $+30$ degrees has been brought about. Then, in the prior art apparatus, the phase change in the input to the decision unit 20 would be the one as represented by $x=30$ degrees in FIG. 1C. The change shown in FIG. 1C is obviously greater than the thresholds of $\pm 22.5$ degrees, resulting in a decision error in the decision unit 20. In contrast, in accordance with the embodiment of the invention, when the phase hit is 30 degrees as shown in FIG. 4A, the change in the phase of the input to the decision unit 20 is as small as $\pm 15$ ($\chi/2$) degrees because the output signal of the delay unit 14 has been delayed by $\tau$ (second), as shown in FIG. 4B, and because the phase component signal fed to the phase modulator 16 has a certain time constant, as shown in FIG. 4C. Such a phase change is smaller than $\pm 22.5$ degrees and, therefore, does not cause any decision error.

While the embodiment has been shown and described in relation to an eight-phase PHM receiver, the present invention is similarly applicable to any other kind of receiver.

In summary, it will be seen that the present invention provides a phase hit compensating apparatus for a receiver which reduces a phase change of an output signal of a phase modulating means by modulating the phase of a delayed signal by a phase component signal, thereby reducing transmission errors ascribable to phase hits.

Various modifications will become possible for those skilled in the art after receiving the teachings of the present disclosure without departing from the scope thereof.

What is claimed is:

1. An apparatus in a receiver for data transmission for compensating for a phase hit, said apparatus comprising:
   a carrier phase detecting means for detecting an out of phase carrier of a received signal, said out of phase carrier having a component which has a phase change that is slower than a phase jitter;
   a delaying means for delaying the received signal; and
   a phase modulating means for modulating a delayed signal output from said delaying means by a phase component signal which is produced by said carrier phase detecting means.

2. An apparatus as claimed in claim 1, wherein the received signal comprises an eight-phase phase modulation signal.

3. An apparatus as claimed in claim 1, further comprising a carrier separating means for separating the carrier from the received signal.

4. An apparatus as claimed in claim 3, wherein said carrier phase detecting means comprises a phase comparator means, a low-pass filter means, and a voltage controlled oscillator means.

5. An apparatus as claimed in claim 1, further comprising a decision means for deciding a phase-modulated signal output by said phase modulating means by using thresholds.

* * * * *